(12) United States Patent
Li (10) Patent No.: US 11,094,928 B2
(45) Date of Patent: Aug. 17, 2021

(54) WOUND-TYPE CELL AND ELECTROCHEMICAL DEVICE

(71) Applicant: NINGDE AMPEREX TECHNOLOGY LIMITED, Ningde (CN)

(72) Inventor: Caicai Li, Ningde (CN)

(73) Assignee: NINGDE AMPEREX TECHNOLOGY LIMITED, Fujian (CN)

(*) Notice: Subject to any disclaimer, the term of this patent is extended or adjusted under 35 U.S.C. 154(b) by 177 days.

(21) Appl. No.: 16/234,210

(22) Filed: Dec. 27, 2018

(65) Prior Publication Data

US 2019/0207212 A1 Jul. 4, 2019

(30) Foreign Application Priority Data

Dec. 28, 2017 (CN) .......................... 201711459269.6

(51) Int. Cl.
| | |
|---|---|
| *H01M 4/36* | (2006.01) |
| *H01M 10/04* | (2006.01) |
| *H01M 4/66* | (2006.01) |
| *H01M 10/0587* | (2010.01) |
| *H01M 10/0525* | (2010.01) |

(52) U.S. Cl.
CPC .......... *H01M 4/366* (2013.01); *H01M 4/667* (2013.01); *H01M 10/0431* (2013.01); *H01M 10/0525* (2013.01); *H01M 10/0587* (2013.01)

(58) Field of Classification Search
CPC .. H01M 4/366; H01M 4/667; H01M 10/0525; H01M 10/0431; H01M 10/0587
See application file for complete search history.

(56) References Cited

U.S. PATENT DOCUMENTS

2015/0349372 A1* 12/2015 Maleki .............. H01M 10/0587
429/94
2018/0034109 A1* 2/2018 Wang .................. H01M 10/125

FOREIGN PATENT DOCUMENTS

| CN | 106025377 A | 10/2016 |
| CN | 205828578 U | 12/2016 |
| CN | 205882099 U | 1/2017 |
| CN | 206401456 U | 8/2017 |
| CN | 107302110 A | 10/2017 |
| JP | 2005-116186 * | 4/2005 |
| JP | 2010287513 A | 12/2010 |

OTHER PUBLICATIONS

English translation of JP Publication 2005-116186, Apr. 2005.*
Ningde Amperex Technology Limited, Office Action, CN201711459269.6, dated Mar. 31, 2021, 9 pgs.

* cited by examiner

*Primary Examiner* — Brittany L Raymond
(74) *Attorney, Agent, or Firm* — Morgan, Lewis & Bockius LLP (57) ABSTRACT

A wound-type cell and an electrochemical device are provided. The wound-type cell includes a negative electrode. The negative electrode includes a negative electrode current collector and a negative electrode active material layer. The negative electrode is composed of a double-sided coated area of the negative electrode active material layer, where surfaces of both sides of the negative electrode current collector are coated with the negative electrode active material layer, and an uncoated area where surfaces of the negative electrode current collector are not coated with the negative electrode active material layer.

18 Claims, 4 Drawing Sheets

WOUND-TYPE CELL AND ELECTROCHEMICAL DEVICE

CROSS-REFERENCE TO RELATED APPLICATIONS

The application claims priority to and benefits of Chinese Patent Application Serial No. 201711459269.6, filed with the State Intellectual Property Office of P. R. china on Dec. 28, 2017, the entire content of which is incorporated herein by reference.

TECHNICAL FIELD

The present disclosure relates to a technical field of batteries, more particularly to a wound-type cell and an electrochemical device using the same.

BACKGROUND

With the commercialization of wound-type cells of batteries, the market is more and more demanding on the cells' energy density. A method for improving the energy density of the wound-type cell of the battery is to reduce thicknesses of a current collector, an electrode tab and a separator, and increase the capacity and compaction density of positive electrode material and negative electrode material.

A conventional wound-type cell is a flat cell formed by stacking and winding a negative electrode, a separator, and a positive electrode. A section of the negative electrode is an uncoated area and coupled with an electrode tab, and a section of the positive electrode is an uncoated area and coupled with the electrode tab. In the related art, the negative electrode has a single-sided coated area of a negative electrode active material layer roughly in one circle inside the flat cell. That is, only an outside surface of the negative electrode current collector of the negative electrode is coated with the negative electrode active material layer, while an inner surface of the negative electrode current collector is not coated with the negative electrode active material layer. During the charging process, due to the structure of the negative electrode active material layer itself, for example, ion intercalation of lithium ions or the like can cause the negative electrode to expand on one side, so that the negative electrode is bent from one side coated with the negative electrode active material layer towards the other side without being coated with the negative electrode active material layer.

The unidirectional bending deformation of the negative electrode will cause the deformation and deterioration of the cell, and as the compaction density of the negative electrode increases, the deformation of the cell becomes more obvious, and the cyclic expansion of the cell during the charging is also significantly deteriorated.

SUMMARY

Aiming at the technical problem existing in the related art, an object of the present disclosure is to provide an improved wound-type cell and an electrochemical device, in which a negative electrode is free of a single-sided coated area of a negative electrode active material layer, and thus it is possible to overcome the technical problem of deformation of the negative electrode of the cell in the related art.

The present disclosure provides a wound-type cell. The wound-type cell includes a negative electrode, in which the negative electrode includes a negative electrode current collector and a negative electrode active material layer. The negative electrode is composed of a negative electrode double-sided coated area, where surfaces of both sides of the negative electrode current collector are coated with the negative electrode active material layer, and a negative electrode uncoated area where surfaces of the negative electrode current collector are not coated with the negative electrode active material layer.

The present disclosure further provides an electrochemical device that has the wound-type cell according to the present disclosure.

Since surfaces of both sides of the negative electrode current collector of the wound-type cell of the present disclosure are coated with the negative electrode active material layer, and thereby, the negative electrode double-sided coated area is formed, it is possible to overcome the technical problem of deformation of the negative electrode caused by the negative electrode single-sided coated area existing inside the cell of the related art.

REFERENCE NUMERALS

10—first separator, 20—second separator, 30—positive electrode, 31—positive electrode current collector, 32—positive electrode active material layer, 40—negative electrode, 41—negative electrode current collector, 42—negative electrode active material layer, 50—first electrode tab, 60—second electrode tab, 70—glue, B—upper portion, B1—upper portion of first wound layer, B2—upper portion of second wound layer, B3—upper portion of third wound layer, B4—upper portion of fourth wound layer, D—left bent portion, D1—left bent portion of first wound layer, D2—left bent portion of second wound layer, D3—left bent portion of third wound layer, D4—left bent portion of fourth wound layer, C—lower portion, C1—lower portion of first wound layer, C2—lower portion of second wound layer, C3—lower portion of third wound layer, C4—lower portion of fourth wound layer, E—right bent portion, E1—right bent portion of first wound layer, E2—right bent portion of second wound layer, E3—right bent portion of third wound layer, W—width direction, H—thickness direction.

DETAILED DESCRIPTION

A wound-type cell of the present disclosure will be described in detail below with reference to the drawings. It should be noted that although the wound-type cell has two separators in the following embodiments for convenience of illustration of technical solutions of the present disclosure, the present disclosure is not limited thereto, and only one separator or more than two separators may be employed.

First Embodiment

Figure 1:
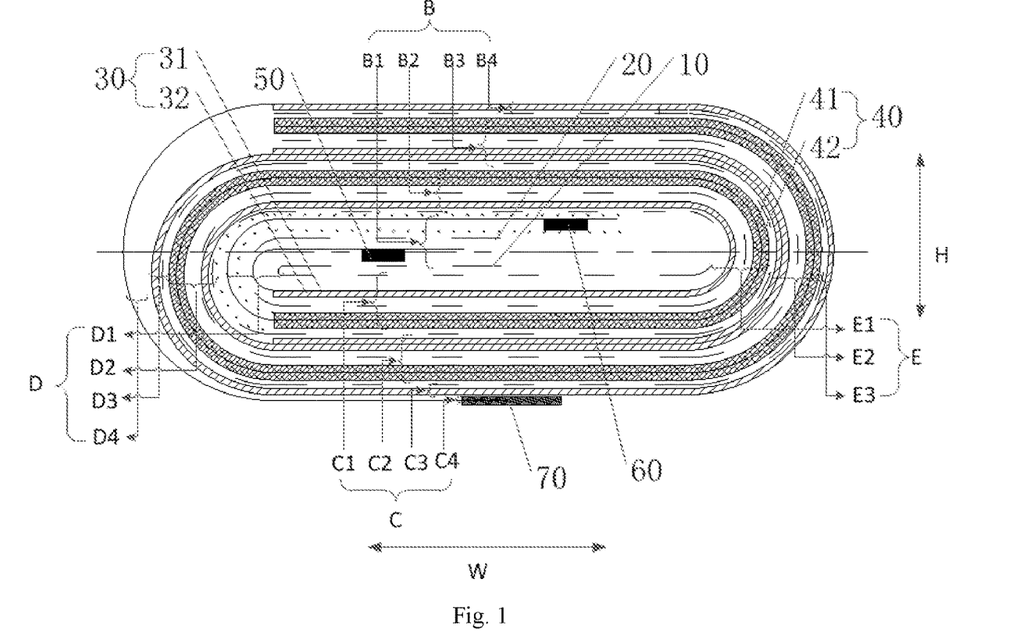
FIG. 1 is a schematic view of a wound-type cell according to a first embodiment of the present disclosure.

Referring to FIG. 1, a wound-type cell of the present disclosure is a flat cell formed in such a way that a first separator 10, a positive electrode 30, a second separator 20, and a negative electrode 40 are sequentially stacked from the inside to the outside and wound. The positive electrode 30 has a positive electrode current collector 31 and a positive electrode active material layer 32 coated on a surface of the positive electrode current collector 31; the negative electrode 40 has a negative electrode current collector 41 and a negative electrode active material layer 42 coated on a surface of the negative electrode current collector 41. A section of the positive electrode 30 is an uncoated area and coupled with a first electrode tab 50, and a section of the negative electrode 40 is an uncoated area and coupled with a second electrode tab 60.

In the present disclosure, "the uncoated area" refers to an area of the electrode without being coated with any active material layer, i.e., an area of the electrode only having the current collector. "The flat cell" refers to a cell with an oblong section. "The section" of the positive electrode refers to a part of the positive electrode where the positive electrode starts to be wound and which is located inside the cell and uncoated with the positive electrode active material layer; "the section" of the negative electrode refers to a part of the negative electrode where the negative electrode starts to be wound and which is located inside the cell and uncoated with the negative electrode active material layer. The section of the negative electrode is taken as an example, and a part surrounded by dotted lines in FIG. 1 indicates the section of the negative electrode.

The flat cell includes an upper portion B and a lower portion C extending along a width direction W, as well as a left bent portion D and a right bent portion E located between the upper portion B and the lower portion C. A center line of the flat cell in the width direction W is a vertical center line of the cell, and a center line of the flat cell in a thickness direction H is a horizontal center line of the cell.

A winding method and process of the wound-type cell of the present embodiment will be described below. It should be understood that the following description is related to a preferred winding method and process, but the winding method and process of the wound-type cell of the present disclosure is not limited thereto.

The first separator 10, the positive electrode 30, the second separator 20 and the negative electrode 40 are sequentially arranged from the inside to the outside, and are wound in a counterclockwise direction from the inside to the outside to form the wound-type cell of the present disclosure. Starting ends of respective sections of the first separator 10 and the second separator 20 are aligned and extend beyond a starting end of the section of the positive electrode 30; a starting end of the section of the negative electrode 40 extends beyond the starting ends of the sections of the first separator 10 and the second separator 20. Meanwhile, the first electrode tab 50 and the second electrode tab 60 are located at two sides of the above starting ends of the first separator 10 and the second separator 20 in the width direction W correspondingly. Thus, the first electrode tab 50 and the second electrode tab 60 do not overlap in the thickness direction H of the cell, thereby avoiding an increase in the thickness of the cell. It should be noted that at the beginning of the winding, since the sections of the positive electrode 30 and the negative electrode 40 are uncoated areas, the first separator 10, the positive electrode current collector 31, the second separator 20 and the negative electrode current collector 41 are initially involved in winding.

At the beginning of the winding process, an upper portion B1 of a first wound layer and a left bent portion D1 of the first wound layer are formed first, in which the first wound layer as the innermost layer of the cell is formed of the first separator 10, the positive electrode current collector 31 of the positive electrode 30, the second separator 20, and the negative electrode current collector 41 of the negative electrode 40.

Then, at a tail end of the left bent portion D1 of the first wound layer, where an outside surface of the positive electrode current collector 31 is coated with the positive electrode active material layer 32, while inside and outside surfaces of the negative electrode current collector 41 are both coated with the negative electrode active material layer 42, the winding is continued in the counterclockwise direction for one circle, so that a lower portion C1 of the first wound layer, a right bent portion E1 of the first wound layer, an upper portion B2 of a second wound layer, and a left bent portion D2 of the second wound layer are sequentially formed by winding.

Starting from a tail end of the left bent portion D2 of the second wound layer, where an inside surface of the positive electrode current collector 31 is also coated with the positive electrode active material layer 32, the winding is continued in the counterclockwise direction, so that a lower portion C2 of the second wound layer, a right bent portion E2 of the second wound layer, and an upper portion B3 of a third wound layer are sequentially formed by winding.

At a tail end of the upper portion B3 of the third wound layer, the negative electrode 40 stops winding, and the second separator 20 also stops winding, the outside surface of the positive electrode current collector 31 is not coated with the positive electrode active material layer 32, and the positive electrode 30 and the first separator 10 continue to wind up counterclockwise, so that a left bent portion D3 of the third wound layer, a lower portion C3 of the third wound layer, a right bent portion E3 of the third wound layer, and an upper portion B4 of a fourth wound layer are formed. The positive electrode active material layer 32 at the inner side of the positive electrode current collector 31 and the first separator 10 terminate at a tail end of the upper portion B4 of the fourth wound layer.

The positive electrode current collector 31 continues to wind up along the counterclockwise direction to form a left bent portion D4 and a lower portion C4 of the fourth wound layer, and a tail end of the lower portion C4 of the fourth wound layer is bonded to the lower portion C3 of the third wound layer by glue. Hence, the wound-type cell illustrated in FIG. 1 is formed.

It can be seen that surfaces at two sides of the negative electrode current collector 41 of the negative electrode 40 of the wound-type cell are both coated with the negative electrode active material layer 42, and a negative electrode double-sided coated area of the negative electrode 40 is formed, that is, no negative electrode single-sided coated area of the negative electrode 40 is present in the entire wound layer. Therefore, the wound-type cell of this embodiment overcomes the following defects in the related art: since the negative electrode 40 has a negative electrode single-sided coated area, that is, one side of the negative electrode current collector 41 is coated with the negative electrode active material layer 42 while the other side thereof is bare, the stress on two sides is different, which easily causes the wrinkling and demolding of the negative electrode current collector 41 and the deformation of the negative electrode 40 due to the one-side expansion of the negative electrode 40 during the charging.

Additionally, it can be seen from FIG. 1 that the innermost portion of the wound-type cell of the present embodiment includes two layers of separators, and compared with four layers of separators adopted in the related art, the wound-type cell of the present disclosure has a higher energy density.

Furthermore, the quantity of layer of the negative electrode double-sided coated area in the upper portion B is identical to the quantity of layer of the negative electrode double-sided coated area in the lower portion C, i.e. the number is two. Moreover, an assumed plane extends along the width direction W and is orthogonal to the thickness direction H, the projections of all the negative electrode double-sided coated areas on the assumed plane overlap each other. Preferably, the negative electrodes 40 of the upper portion B and the lower portion C of the wound-type cell are symmetrical with respect to the horizontal center line of the cell. In this way, the defect in the related art that the cell is bent and deformed from one side where the number of the negative electrodes is large to the other side where the number of the negative electrodes is small during the charging process is overcome. Meanwhile, due to the symmetrical structure of the wound-type cell relative to the horizontal center line of the cell, a part of the expansion force on two sides of the cell is mutually counteracted and weakened, so that partial expansion can also be suppressed, thereby facilitating the improvement of energy density after the cell cycle. In addition, in this embodiment, in order to ensure the above effect, the quantity of layer of the positive electrode double-sided coated area in the upper portion B and the quantity of layer of the positive electrode double-sided coated area in the lower portion C are further made the same, and the projections of the positive electrode double-sided coated area on the above assumed plane overlap each other; the quantity of layer of the positive electrode single-sided coated area in the upper portion B and the quantity of layer of the positive electrode single-sided coated area in the lower portion C are further made the same, and the projections of all the positive electrode single-sided coated areas on the above assumed plane overlap each other.

Although the negative electrodes on two sides of the vertical center line of the cell are asymmetrical in this embodiment, since the lithium ion cell generally has a small thickness and tends to be ultra-thin, eliminating or reducing the deformation of the cell in the horizontal plane has greater effect on the development of ultra-thin cells. Since the cell is thin, during the charging, the number of lithium ions intercalated in the cell at both ends in the width direction W is small, and the resulting expansion is small, which may be disregarded.

The positive electrode active material layer 32 may specifically be at least one of lithium cobaltate, lithium iron phosphate, and lithium manganate. The negative electrode active material layer 42 may specifically be at least one of graphite, hard carbon, and silicon.

Second Embodiment

Figure 2:
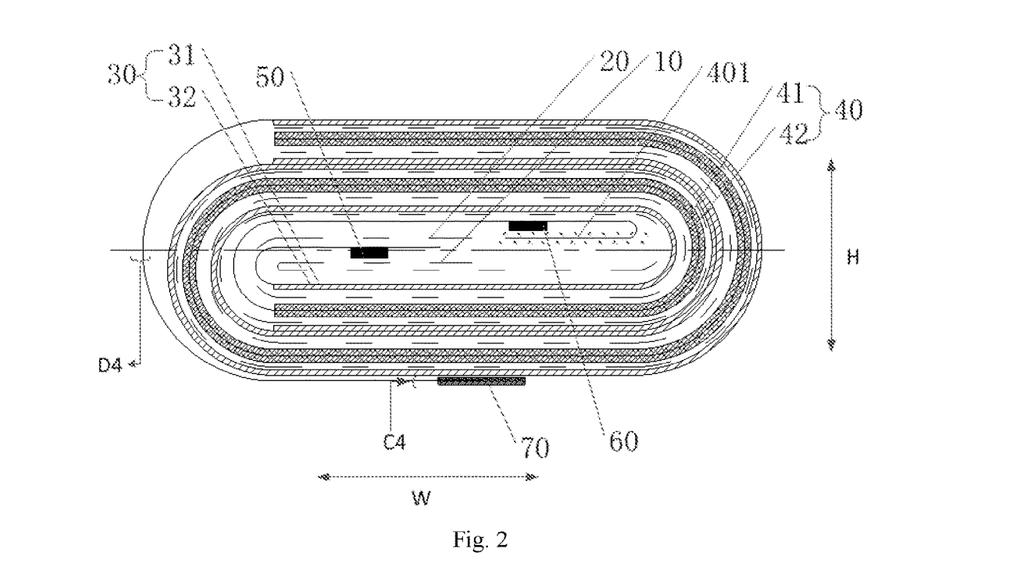
FIG. 2 is a schematic view of a wound-type cell according to a second embodiment of the present disclosure.

Referring to FIG. 2, based on the first embodiment, the section of the negative electrode current collector 41 of the negative electrode 40 has a fold-back part 401 formed by being folded back inwards (e.g. a portion enclosed by dotted block in FIG. 2), and the arrangement of the fold-back part 401 can facilitate clamping of a winding apparatus. Meanwhile, the fold-back part 401 can ensure that sufficient space exists during the cutting of the negative electrode 40, and no glue for electrode tabs will be cut. Specifically, the fold-back part 401 can be formed in such a way that the fold-back part 401 is bent at the section of negative electrode current collector 41 for 180 degree clockwise. Preferably, the fold-back part 401 does not overlap the first electrode tab 50 in the thickness direction H, thereby avoiding an increase in the thickness of the cell. Likewise, the section of the positive electrode current collector 31 of the positive electrode 30 also has a fold-back part formed by being folded back inwards (not illustrated in drawings). Other features of this embodiment are identical to the first embodiment.

Third Embodiment

Figure 3:
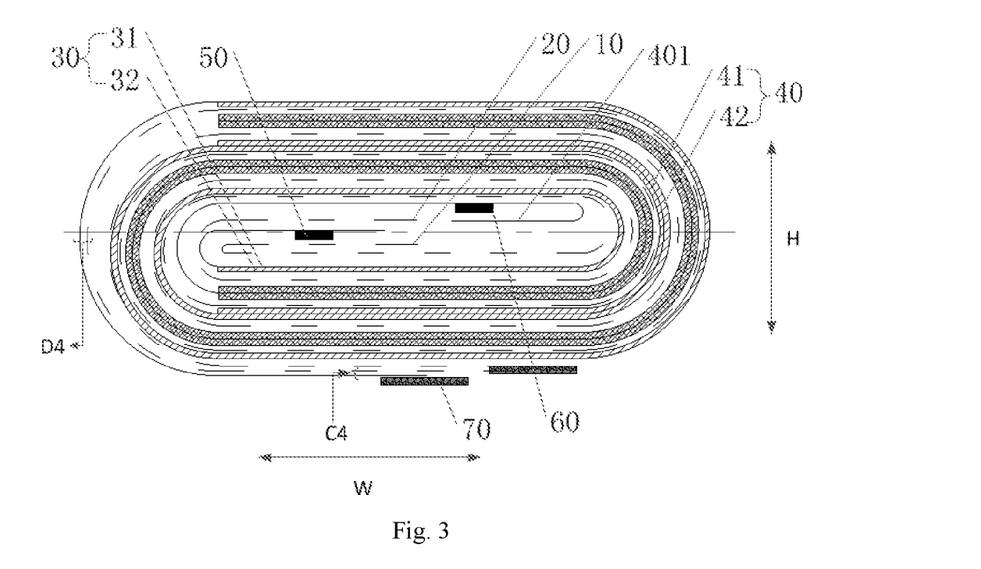
FIG. 3 is a schematic view of a wound-type cell according to a third embodiment of the present disclosure.

Referring to FIG. 3, based on the second embodiment, the first separator 10 continues to wind at the tail end of the upper portion B4 of the fourth wound layer, and the second separator 20 continues to wind at the tail end of the upper portion B3 of the third wound layer, until they exceed the tail end of the lower portion C4 of the fourth wound layer by a segment. By doing so, a contact of an outside surface of a bare cell and a packaging bag is changed from a current collector surface being in contact with the packaging bag to both of the current collector surface and part of the separator being in contact with the packaging bag. Because the contact between the separator and the packaging bag increases friction between the cell and the packaging bag, it is possible to prevent the cell from slipping out of or being displaced in the packaging bag during a drop or impact, and avoid the occurrence of malposition of the positive electrode and negative electrode inside the cell during the second drop or impact. Thus, the extended separator helps improve the anti-dropping performance of the cell. Other features of this embodiment are identical to the second embodiment.

Fourth Embodiment

Figure 4:
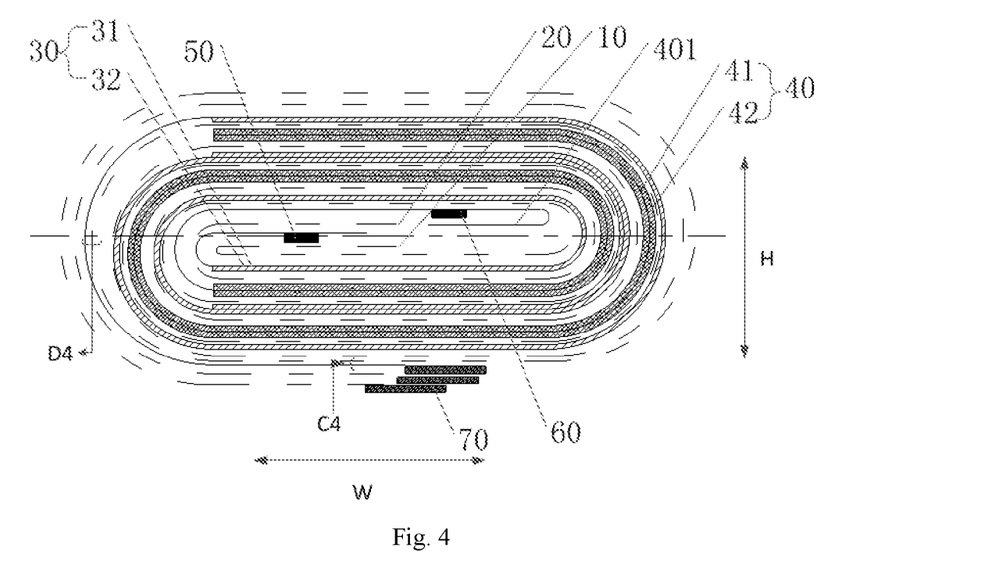
FIG. 4 is a schematic view of a wound-type cell according to a fourth embodiment of the present disclosure.

Referring to FIG. 4, based on the third embodiment, the first separator 10 and the second separator 20 are wound around the outside of the bare cell for one circle, so as to increase the friction between the bare cell and the packaging bag to a maximum extent, and further improve the anti-dropping performance of the cell. Other features of this embodiment are identical to the third embodiment.

Fifth Embodiment

Figure 5:
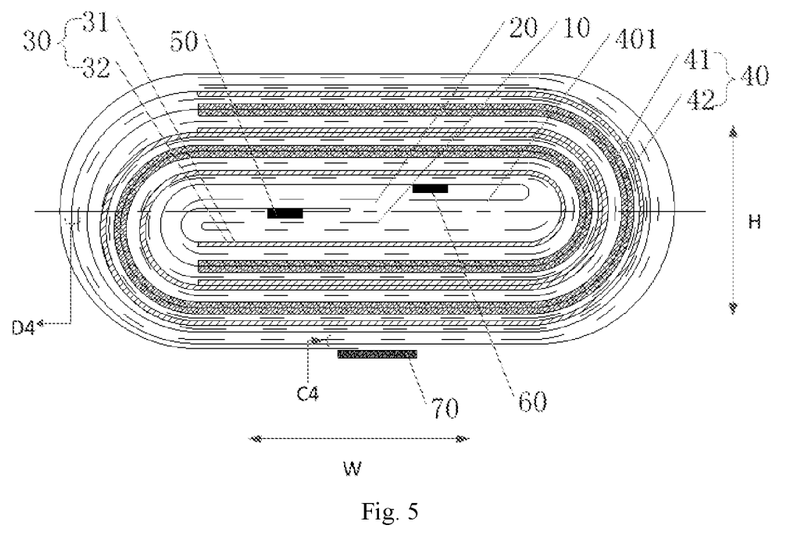
FIG. 5 is a schematic view of a wound-type cell according to a fifth embodiment of the present disclosure.

Referring to FIG. 5, in order to improve abuse performance of the cell, based on the third embodiment, the outermost layers of the positive electrode current collector 31 (aluminum foil) and the negative electrode current collector 41 (copper foil) of the cell continue to wind around the bare cell for one circle, so as to form a protective layer (also called outer jacket) at both sides in the thickness direction H of the cell. In the case of abusing the cell or in an abuse performance test of the cell, when an external short circuit occurs to an outer layer of the cell because the cell is damaged by an external force or a foreign object, the protective layer is preferentially short-circuited. When the protective layer is short-circuited, it will not cause combustion because there is no active material at the short-circuit point. Meanwhile, since the short circuit occurs at the outermost side of the cell, the heat generated by the short circuit can be radiated outwards along the current collector with good thermal conductivity, thereby avoiding fire and explosion. Therefore, this embodiment can improve safety performance of the cell. Other features of this embodiment are identical to the third embodiment.

Additionally, it should be noted that the protective layer may not be provided to the outermost layer, and may not need to be wound for one circle, but instead, the protective layer can be provided to other positions of the cell and have a suitable winding length according to requirements.

Sixth Embodiment

Figure 6:
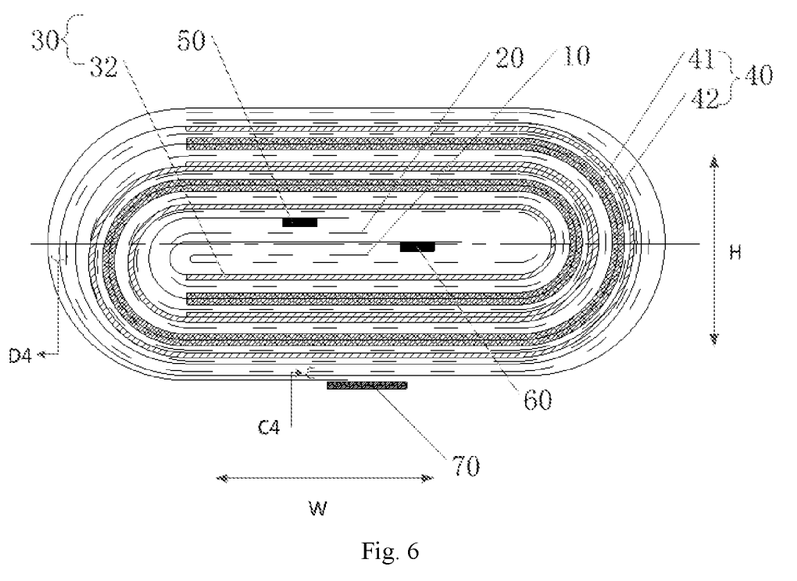
FIG. 6 is a schematic view of a wound-type cell according to a sixth embodiment of the present disclosure.

Referring to FIG. 6, based on the fifth embodiment, the positions of the positive electrode and negative electrode of the cell can be changed by changing the relative position of the first electrode tab 50 and the second electrode tab 60, such that the wound-type cell of the present disclosure can be mounted to various portable apparatus. For example, the positions of the first electrode tab 50 and the second electrode tab 60 in the width direction W are exchanged, so as to satisfy a portable apparatus with reversed positions of the positive electrode and negative electrode compared with the conventional apparatus. Other features of this embodiment are identical to the fifth embodiment.

Seventh Embodiment

Figure 7:
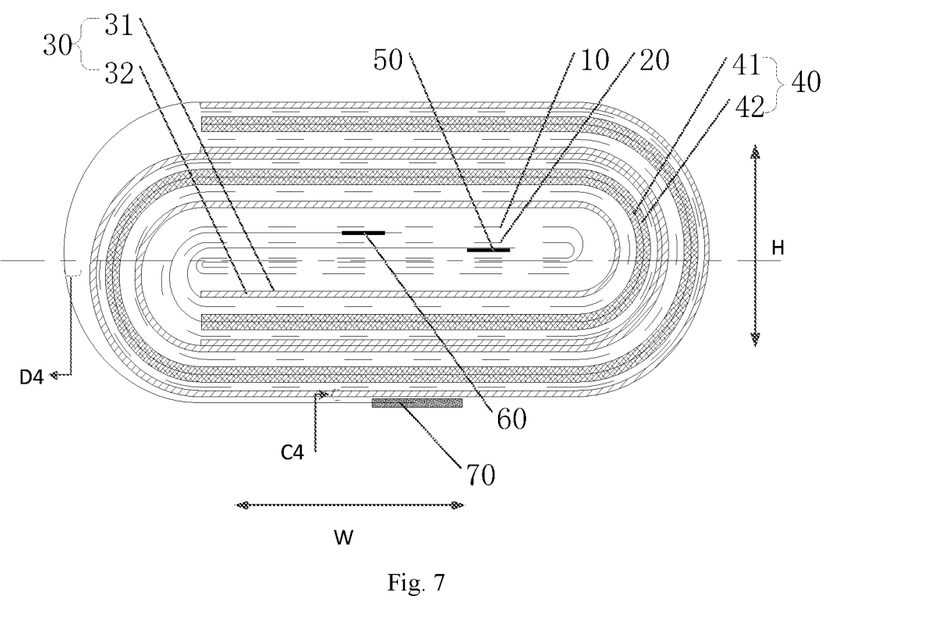
FIG. 7 is a schematic view of a wound-type cell according to a seventh embodiment of the present disclosure.

Referring to FIG. 7, based on the first embodiment, the first separator 10 and the second separator 20 inside the wound-type cell of this embodiment can be redundantly wound into a four-layer structure, as in the related art. Other features of this embodiment are identical to the first embodiment. In the present disclosure, "being redundantly wound" means that the first separator 10 and the second separator 20 are wound with no separation effect on the positive electrode 30 and the negative electrode 40.

In practical applications, the first electrode tab 50 can be specifically provided at any position of the positive electrode current collector 31, and the second electrode tab 60 can be specifically provided at any position of the negative electrode current collector 41, which can be flexibly set based on the specific use situation and location of the cell.

Although the winding of the cell is explained by example of counterclockwise winding in the above embodiments, the winding manner of the wound-type cell is not particularly defined in the present disclosure, as long as both sides of the negative electrode 40 are coated with the negative electrode active material layer 42 to form the negative electrode double-sided coated area.

The above description only involves specific embodiments of the present disclosure, but the protection scope of the present disclosure is not limited thereto. Any changes or alternatives that can be easily conceived by those skilled in the art within the technical scope of the present disclosure should be included in the protection scope of the present disclosure.

What is claimed is:

1. A wound-type cell, comprising:
a negative electrode, the negative electrode comprising:
a negative electrode current collector; and
a negative electrode active material layer, wherein a portion of the negative electrode that comprises the negative electrode active material layer consists of a double-sided coated area, where surfaces of both sides of the negative electrode current collector are coated with the negative electrode active material layer, and wherein the negative electrode current collector comprises a negative electrode uncoated area where surfaces of the negative electrode current collector are not coated with the negative electrode active material layer, and
a positive electrode, the positive electrode comprises a positive electrode current collector and a positive electrode active material layer, the positive electrode having a positive electrode uncoated area, where surfaces of the positive electrode current collector are not coated with the positive electrode active material layer,
wherein the positive electrode uncoated area is wound around the wound-type cell by a predetermined length at the outermost layer of the wound-type cell.

2. The wound-type cell according to claim 1, wherein the wound-type cell comprises an upper portion and a lower portion extending along a width direction, and a bent portion located between the upper portion and the lower portion;
the quantity of layer of the negative electrode double-sided coated area in the upper portion is identical to the quantity of layer of the negative electrode double-sided coated area in the lower portion; and
an assumed plane extends along the width direction of the wound-type cell and is orthogonal to the thickness direction of the wound-type cell, projections of all the negative electrode double-sided coated areas on the assumed plane overlap each other.

3. The wound-type cell according to claim 2, wherein;
the positive electrode further comprises a positive electrode single-sided coated area, where a surface of only one side of the positive electrode current collector is coated with the positive electrode active material layer; and
the quantity of layer of the positive electrode single-sided coated area in the upper portion is identical to the quantity of layer of the positive electrode single-sided coated area in the lower portion, and projections of all the positive electrode single-sided coated areas on the assumed plane overlap each other.

4. The wound-type cell according to claim 3, wherein a section of the positive electrode uncoated area has a fold-back part.

5. The wound-type cell according to claim 3, wherein the wound-type cell further comprises a separator, a winding end of the separator exceeds a winding end of the positive electrode, the separator is wound around an outer side of the wound-type cell, and the winding end of the separator exceeding the winding end of the positive electrode by at least one circle.

6. The wound-type cell according to claim 3, wherein a first electrode tab is coupled to any position of the positive electrode uncoated area, and a second electrode tab is coupled to any position of the negative electrode uncoated area, in which the first electrode tab does not overlap the second electrode tab in the thickness direction of the wound-type cell.

7. The wound-type cell according to claim 2, wherein
the positive electrode further comprises a positive electrode double-sided coated area, where surfaces of both sides of the positive electrode current collector are coated with the positive electrode active material layer; and
the quantity of layer of the positive electrode double-sided coated area in the upper portion is identical to the quantity of layer of the positive electrode double-sided coated area in the lower portion, and projections of all the positive electrode double-sided coated areas on the assumed plane overlap each other.

8. The wound-type cell according to claim 2, wherein the positive electrode comprises a positive electrode single-sided coated area, where a surface of only one side of the positive electrode current collector is coated with the positive electrode active material layer, and a positive electrode double-sided coated area, where surfaces of both sides of the positive electrode current collector are coated with the positive electrode active material layer;

the quantity of layer of the positive electrode double-sided coated area in the upper portion is identical to the quantity of layer of the positive electrode double-sided coated area in the lower portion, and projections of all the positive electrode double-sided coated areas on the assumed plane overlap each other; and the quantity of layer of the positive electrode single-sided coated area in the upper portion is identical to the quantity of layer of the positive electrode single-sided coated area in the lower portion, and projections of all the positive electrode single-sided coated areas on the assumed plane overlap each other.

9. The wound-type cell according to claim 1, wherein a section of the negative electrode uncoated area has a fold-back part.

10. The wound-type cell according to claim 1, wherein the wound-type cell further comprises a separator, a winding end of the separator exceeds a winding end of the negative electrode, the separator is wound around an outer side of the wound-type cell, and the winding end of the separator exceeding the winding end of the negative electrode by at least one circle.

11. The wound-type cell according to claim 1, wherein the wound-type cell further comprises a separator, and the quantity of layer of the separator being only wound with itself inside the wound-type cell is less than four.

12. An electrochemical device, comprising a wound-type cell,
the wound-type cell comprising a negative electrode, the negative electrode comprising:
a negative electrode current collector; and
a negative electrode active material layer, wherein a portion of the negative electrode that comprises the negative electrode active material layer consists of a double-sided coated area, where surfaces of both sides of the negative electrode current collector are coated with the negative electrode active material layer, and wherein the negative electrode current collector comprises a negative electrode uncoated area where surfaces of the negative electrode current collector are not coated with the negative electrode active material layer; and
a positive electrode, the positive electrode comprises a positive electrode current collector and a positive electrode active material layer, the positive electrode having a positive electrode uncoated area, where surfaces of the positive electrode current collector are not coated with the positive electrode active material layer,
wherein the positive electrode uncoated area is wound around the wound-type cell by a predetermined length at the outermost layer of the wound-type cell.

13. The electrochemical device according to claim 12, wherein the wound-type cell comprises an upper portion and a lower portion extending along a width direction, and a bent portion located between the upper portion and the lower portion;

the quantity of layer of the negative electrode double-sided coated area in the upper portion is identical to the quantity of layer of the negative electrode double-sided coated area in the lower portion; and an assumed plane extends along the width direction of the wound-type cell and is orthogonal to the thickness direction of the wound-type cell, projections of all the negative electrode double-sided coated areas on the assumed plane overlap each other.

14. The electrochemical device according to claim 13, wherein
the positive electrode further comprises a positive electrode single-sided coated area, where a surface of only one side of the positive electrode current collector is coated with the positive electrode active material layer; and the quantity of layer of the positive electrode single-sided coated area in the upper portion is identical to the quantity of layer of the positive electrode single-sided coated area in the lower portion, and projections of all the positive electrode single-sided coated areas on the assumed plane overlap each other.

15. The electrochemical device according to claim 14, wherein a section of the positive electrode uncoated area has a fold-back part.

16. The electrochemical device according to claim 13, wherein
the positive electrode further comprises a positive electrode double-sided coated area, where surfaces of both sides of the positive electrode current collector are coated with the positive electrode active material layer; and the quantity of layer of the positive electrode double-sided coated area in the upper portion is identical to the quantity of layer of the positive electrode double-sided coated area in the lower portion, and projections of all the positive electrode double-sided coated areas on the assumed plane overlap each other.

17. The electrochemical device according to claim 13, wherein
the positive electrode further comprises a positive electrode single-sided coated area, where a surface of only one side of the positive electrode current collector is coated with the positive electrode active material layer, a positive electrode double-sided coated area, where surfaces of both sides of the positive electrode current collector are coated with the positive electrode active material layer, and a positive electrode uncoated area where surfaces of the positive electrode current collector are not coated with the positive electrode active material layer;

the quantity of layer of the positive electrode double-sided coated area in the upper portion is identical to the quantity of layer of the positive electrode double-sided coated area in the lower portion, and projections of all the positive electrode double-sided coated areas on the assumed plane overlap each other; and the quantity of layer of the positive electrode single-sided coated area in the upper portion is identical to the quantity of layer of the positive electrode single-sided coated area in the lower portion, and projections of all the positive electrode single-sided coated areas on the assumed plane overlap each other.

18. The electrochemical device according to claim 12, wherein the wound-type cell further comprises a separator, and the quantity of layer of the separator being only wound with itself inside the wound-type cell is less than four.

\* \* \* \* \*